(12) United States Patent
Fishel

(10) Patent No.: US 8,553,213 B2
(45) Date of Patent: Oct. 8, 2013

(54) SELF-ALIGNING LASER GUIDE FOR A WHEEL BALANCER

(75) Inventor: Ryan William Fishel, Wellsville, PA (US)

(73) Assignee: Perfect Result, LLC, Wellsville, PA (US)

( * ) Notice: Subject to any disclaimer, the term of this patent is extended or adjusted under 35 U.S.C. 154(b) by 305 days.

(21) Appl. No.: 12/859,996

(22) Filed: Aug. 20, 2010

(65) Prior Publication Data

US 2011/0126620 A1 Jun. 2, 2011

Related U.S. Application Data

(60) Provisional application No. 61/265,843, filed on Dec. 2, 2009.

(51) Int. Cl.
*G01B 11/26* (2006.01)

(52) U.S. Cl.
USPC .................................................. 356/139.09

(58) Field of Classification Search
USPC ............ 356/3.01–3.15, 4.01–4.1, 5.01–5.15, 356/6–22, 28, 28.5, 139.01–139.1, 155
See application file for complete search history.

(56) References Cited

U.S. PATENT DOCUMENTS

| | | | |
|---|---|---|---|
| 4,311,386 A | 1/1982 | Coetsier | |
| 4,466,196 A | 8/1984 | Woodruff | |
| 4,898,464 A | 2/1990 | Thorne et al. | |
| 5,274,433 A | 12/1993 | Madey et al. | |
| 5,443,537 A | 8/1995 | Haskins | |
| 5,532,816 A | 7/1996 | Spann et al. | |
| 5,731,870 A | 3/1998 | Bartko et al. | |
| 6,244,108 B1 | 6/2001 | McInnes et al. | |
| 6,400,451 B1 | 6/2002 | Fukuda et al. | |
| 6,484,574 B1 | 11/2002 | Douglas et al. | |
| 6,657,711 B1 | 12/2003 | Kitagawa et al. | |
| 7,548,307 B2 | 6/2009 | Wesby | |
| 7,594,437 B2 | 9/2009 | Matteucci et al. | |
| 7,715,026 B2 * | 5/2010 | Nayebi | 356/625 |
| 2005/0052657 A1 | 3/2005 | Braghiroli | |
| 2005/0052658 A1 * | 3/2005 | Braghiroli | 356/602 |
| 2007/0175275 A1 | 8/2007 | Carpenter et al. | |
| 2008/0150348 A1 * | 6/2008 | Douglas et al. | 301/5.21 |

* cited by examiner

*Primary Examiner* — Luke Ratcliffe

(74) *Attorney, Agent, or Firm* — Behravesh & Richmond, PLLC

(57) ABSTRACT

A self-aligning laser guide device capable of indicating a top dead-center of a wheel on a wheel balancer and a process for locating the top dead-center of the wheel. The self-aligning laser guide can include a body having a laser beam generating device and a wheel balancer shaft mounting adaptor configured to be rotatably connected to the body at one end and configured to be removably connected to a wheel balancer shaft at the other end.

19 Claims, 6 Drawing Sheets

SELF-ALIGNING LASER GUIDE FOR A WHEEL BALANCER

PRIORITY CLAIM

This application claims the benefit of provisional application Ser. No. 61/265,843, filed Dec. 2, 2009, which is relied upon and incorporated herein by reference.

FIELD OF THE INVENTION

The present teachings relate to a self-aligning laser guide for a wheel balancer. In particular, the present teachings relate to a device and process for locating the top dead-center of a wheel.

BACKGROUND OF THE INVENTION

Electro-mechanical wheel balancers are well known in the vehicle maintenance trade. These machines often include a chassis in the form of a cabinet in which various components and systems are housed. An imbalanced wheel is mounted to a rotatable shaft that extends from the chassis, typically using various mounting cones or other adapters. The shaft is rotatably driven by a suitable drive system (such as a direct drive motor or motor with a belt drive connected to a spindle) to create a dynamic imbalance condition. In addition, prior art balancing systems include an arm that can assist in measuring the wheel's dimensions (i.e., the distance from the machine and the wheels diameter). These devices have further included sensors to detect the wheel imbalance forces and electronic circuitry to analyze the forces and display an amount of weight needed to balance the wheel.

It is well known in the art to attach corrective weights (typically clip weights) of various masses to the outer and inner flange of a wheel to balance the wheel. After spinning the wheel to determine its dynamic imbalance, if any, the wheel balancer may resolve the imbalance vector into two opposite vectors corresponding to the positions on the two wheel flanges (outer and inner) where the weights are to be placed.

When using this type of balancer, the wheel balancer defines the locations where the corrective weights can be applied. An operator of the wheel balancer can then rotate the wheel to the location determined by the wheel balancer. Next, the operator places a corrective weight at top dead-center on the flange of the wheel in an amount calculated by the wheel balancer.

A challenge in placing weights on the outer surface of the wheel is accurately placing the weight at the location prescribed by the machine. If the weight is mislocated, then the wheel will show an imbalance when a check spin is performed. Determining the exact location of the top dead-center of the wheel where the balancing weight should be attached is complicated and time consuming. Thus, correctly placing the balancing weight on the first attempt can help reduce time and cost.

Many attempts to solve the above-mentioned problems have been made. For example, complex wheel balancers with laser-assisted weight placement systems have been developed. Such systems are disclosed, for example, in U.S. Pat. Nos. 6,484,574 and 6,244,108, and U.S. Patent Application Publication No. 2007/0175275. However, these systems are prohibitively expensive and their laser system is proprietary, non-portable, and unusable on many existing wheel balancers.

Accordingly, a need exists in the industry for a portable laser guide for a wheel balancer that can be connected to most existing wheel balancers and can indicate the top dead-center of a wheel so that the operator of the wheel balancer can accurately position and secure the balancing weight on the proper area of the wheel, thereby saving time and providing a more accurate balance.

SUMMARY OF THE INVENTION

The present teachings provide a self-aligning laser guide for a wheel balancer that includes a body having a laser beam generating device and a wheel balancer shaft mounting adaptor. The wheel balancer shaft mounting adaptor can be configured to be rotatably connected to the body at one end and configured to be removably connected at another end to a wheel balancer shaft of the wheel balancer.

The present teachings provide that the wheel balancer shaft mounting adaptor is configured to be rotatably connected to the body via an axle and at least one bearing disposed around the axle.

The present teachings provide that the wheel balancer shaft mounting adaptor includes a threaded opening such that the wheel balancer shaft mounting adaptor screws onto the wheel balancer shaft.

The present teachings provide that the wheel balancer shaft mounting adaptor includes an opening sized to receive said wheel balancer shaft.

The present teachings provide that the wheel balancer shaft mounting adaptor is configured to be friction fitted onto the wheel balancer shaft.

The present teachings provide that the wheel balancer shaft mounting adaptor includes a magnet disposed in the opening such that when the wheel balancer shaft is received in the opening, the magnet magnetically connects to the wheel balancer shaft.

The present teachings provide that the wheel balancer shaft mounting adaptor includes an electromagnet to removably connect the wheel balancer shaft mounting adaptor to the wheel balancer shaft.

The present teachings further provide a setscrew in communication with the laser beam generating device for calibrating and securing the laser beam generating device at a desired location.

The present teachings provide that the laser beam generating device is mounted on a pivot.

The present teachings further provide a timer connected to a power source and configured to disconnect power provided from the power source to the laser beam generating device after a predetermined time.

The present teachings provide that the body includes a top half and a bottom half and wherein the laser beam generating device is positioned on the top half of the body.

The present teachings further provide a counterweight disposed on the bottom half of the body.

The present teachings provide that the counterweight has a selected weight, wherein when the self-aligning laser guide is connected to the wheel balancer shaft, the self-aligning laser guide longitudinal axis is substantially perpendicular to a floor surface.

The present teachings provide that the counterweight comprises a power source.

The present teachings further provide a sensor configured to detect a signal generated by the wheel balancer that indicates to an operator to place and secure a balancing weight at a top dead-center of a wheel.

The present teachings provide that the sensor is configured to turn on the self-aligning laser guide after receiving the signal generated from the wheel balancer.

The present teachings provide a method for placing balancing weight on a wheel using a self-aligning laser guide including mounting a wheel on the wheel balancer shaft of a wheel balancer, starting the wheel balancer, removably connecting the self-aligning laser guide to the wheel balancer shaft, powering the self-aligning laser guide to indicate a top dead-center of the wheel, positioning a desired balancing weight on the indicated top dead-center of the wheel, and securing the balancing weight on the wheel.

The present teachings provide that the step of removably connecting the self-aligning laser guide to the wheel balancer shaft includes securing at least a portion of the wheel balancer shaft mounting adaptor to the wheel balancer shaft.

The present teachings further provide calibrating said self-aligning laser guide.

The present teachings provide a method for determining a top dead-center of a wheel. The method includes the steps of removably connecting the self-aligning laser guide to a wheel balancer shaft, allowing gravity to position the self-aligning laser guide such that its longitudinal axis is substantially perpendicular to a floor surface, and powering the self-aligning laser guide to indicate the top dead-center of the wheel.

The present teachings provide a self-aligning laser guide that includes a body including a laser beam generating device; and a mounting adaptor configured to be rotatably connected to the body at one end and configured to be removably connected at another end to a device, such that when the self-aligning laser guide is removably connected to the device, the self-aligning laser guide longitudinal axis is substantially perpendicular to a floor surface.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to a self-aligning laser guide that can include a body having a laser beam generating device and a mounting adaptor that is configured to be rotatably connected to the body at one end and configured to be removably connected at another end to a device, such as a wheel balancer.

The present teachings are directed to a self-aligning laser guide for locating the top dead-center of a wheel. The self-aligning laser guide can be a portable handheld device that can be removably connected to most existing wheel balancers to precisely determine the top dead-center of a wheel where balancing weights can be placed and secured to properly balance a wheel.

Figure 1:
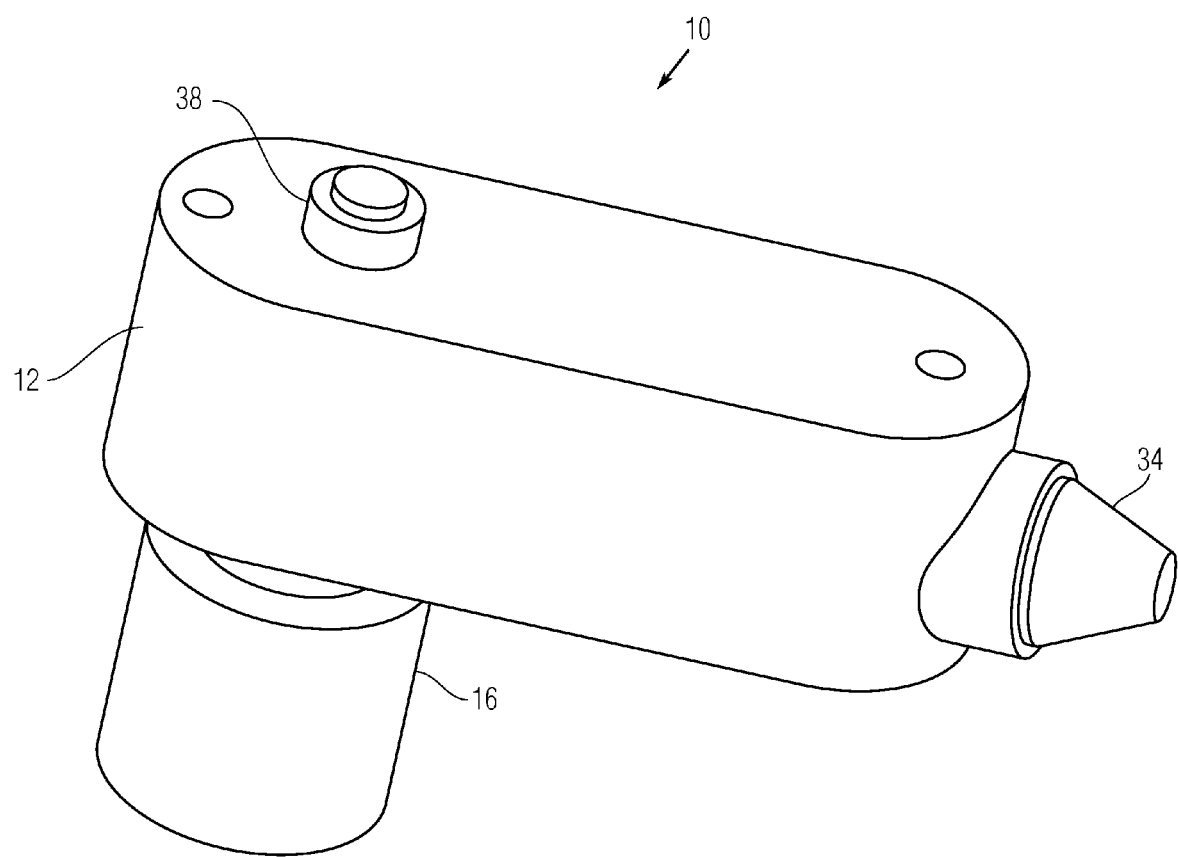
FIG. 1 is a perspective view of a self-aligning laser guide according to various embodiments.

FIG. 1 is a perspective view of an exemplary embodiment of the self-aligning laser guide 10 of the present teachings. The self-aligning laser guide 10 can include a body 12 and an adaptor, such as a wheel balancer shaft mounting adaptor 16 that can be rotatably connected to the body 12 at one end.

Figure 2:
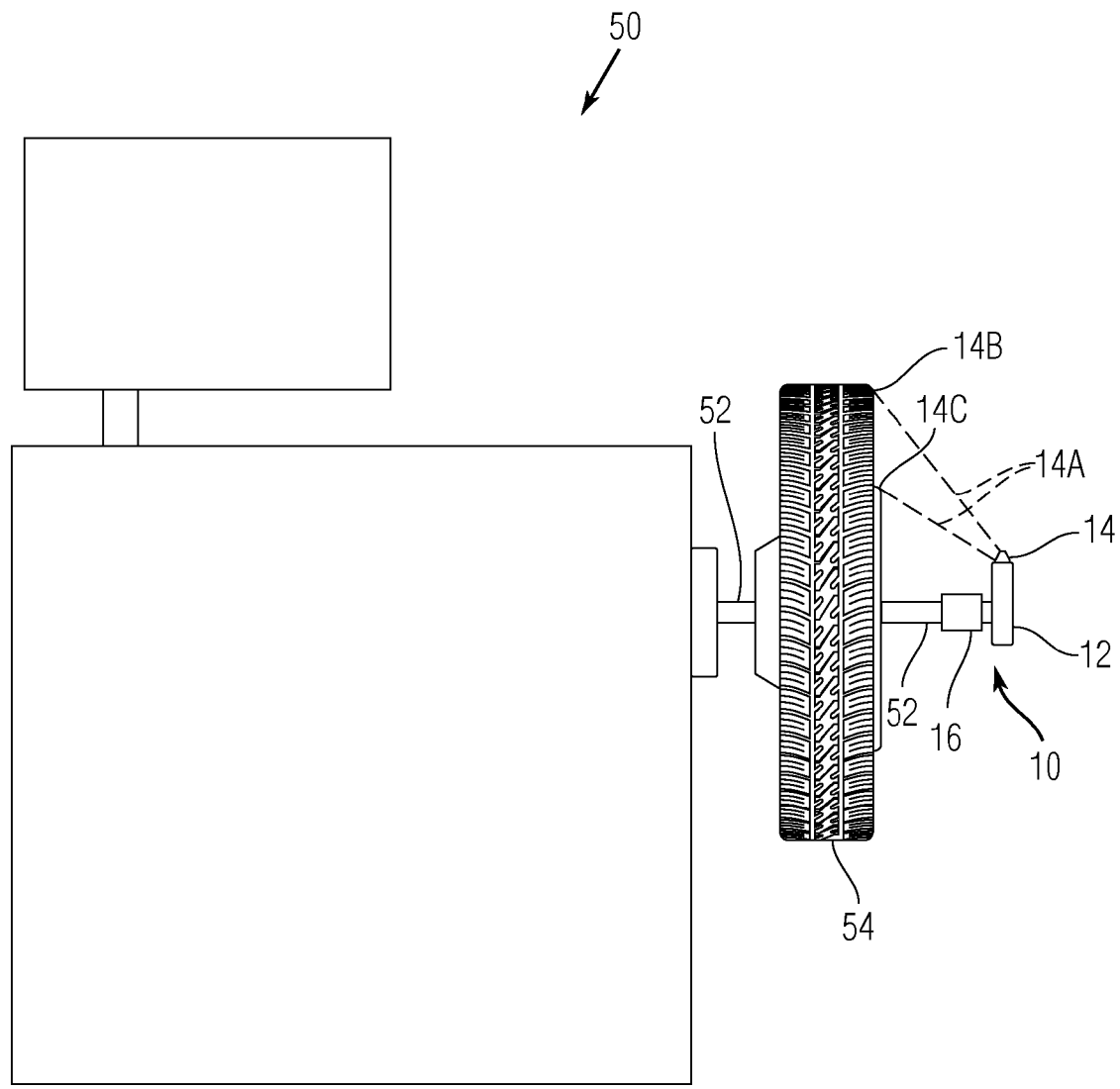
FIG. 2 is a side view of a wheel balancer with a self-aligning laser guide attached therein according to various embodiments.

FIG. 2 illustrates the side view of a typical wheel balancer 50 with the self-aligning laser guide 10 of the present teachings removably connected thereon. As shown in FIG. 2, the wheel balancer 50 includes a balancer shaft 52, to which a wheel 54 can be secured. Once the wheel 54 has been secured and the wheel balancer 50 has determined the amount of weight that is needed to be placed and secured at the top dead-center of the wheel, the self-aligning laser guide 10 can be removably connected to the balancer shaft 52. In an exemplary configuration, the self-aligning laser guide 10 can be removably connected to the end portion of the balancer shaft 52 via the wheel balancer shaft mounting adaptor 16.

Figure 3:
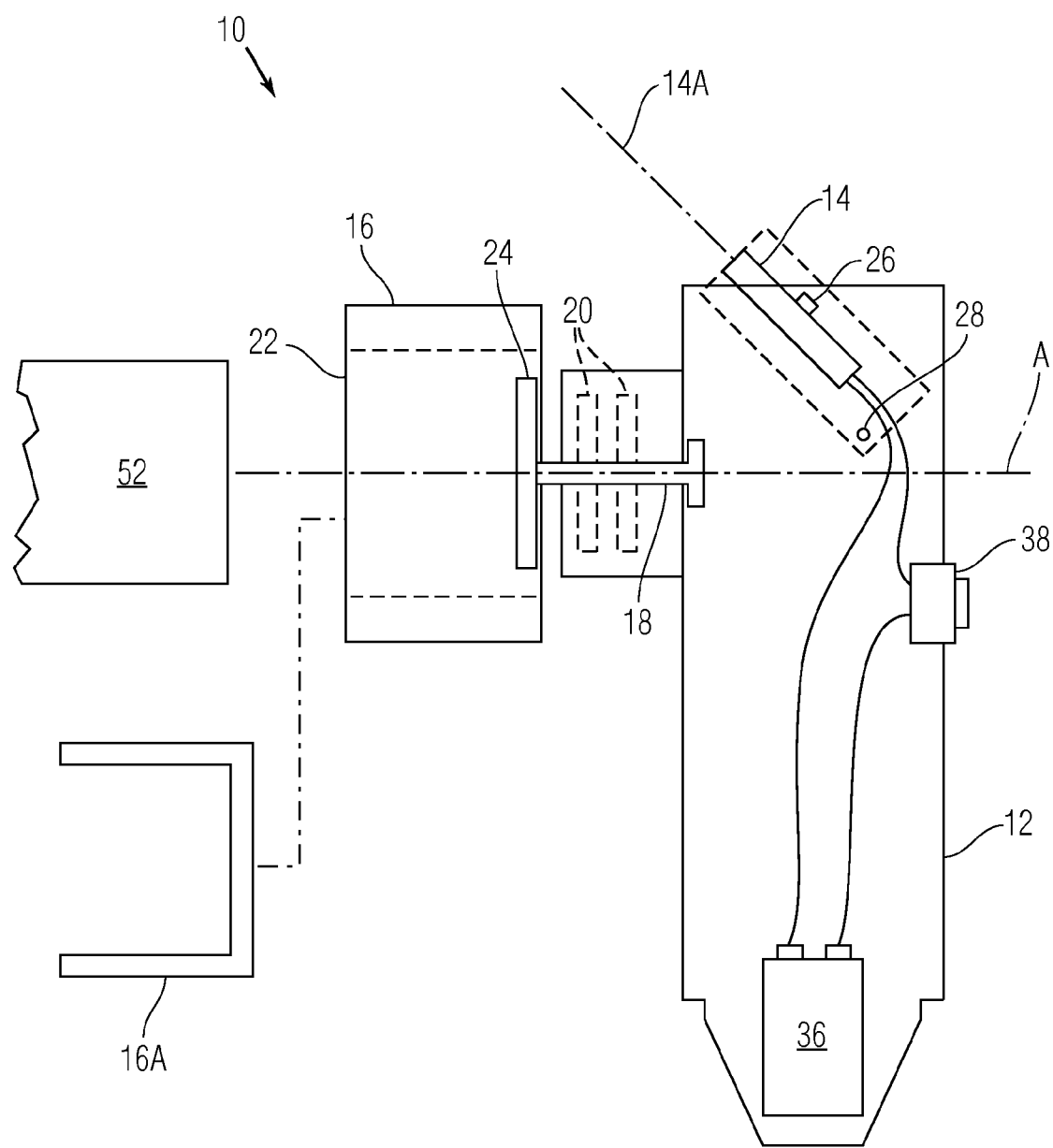
FIG. 3 is a cross-sectional view of one embodiment of the self-aligning laser guide according to various embodiments.

FIG. 3 illustrates one exemplary embodiment of the self-aligning laser guide 10 of the present teachings. Referring to FIGS. 1 and 3, the self-aligning laser guide 10 can include the body 12 that is capable of housing at least a portion of a laser beam generating device 14. Additionally, the wheel balancer shaft mounting adaptor 16 can be rotatably connected to the body 12 at one end and is configured to be removably connected to the balancer shaft 52 at the other end. The wheel balancer shaft mounting adaptor 16 may be rotatably connected to the body 12 via an axle 18 and at least one bearing 20 (e.g., a roller bearing) positioned around the axle 18, such that the wheel balancer shaft mounting adaptor 16 and the body 12 can rotate freely, with respect to one another, along an axis, e.g., axis A.

The wheel balancer shaft mounting adaptor 16 may be designed to fit and removably connect to most size wheel balancer shaft 52. For example, the wheel balancer shaft mounting adaptor 16 can be cylindrical in shape having an opening 22 with a diameter and a depth large enough such that the wheel balancer shaft mounting adaptor 16 can slide over the wheel balancer shaft 52. For example, the depth of the opening can be from about 1 inch or less to about 2 inches or more. In one exemplary embodiment, to secure the wheel balancer shaft mounting adaptor 16 to the wheel balancer shaft 52, the opening 22 can include a diameter such that the wheel balancer shaft mounting adaptor 16 is friction fitted onto the wheel balancer shaft 52. Alternatively and/or additionally, the opening 22 can include a magnet 24 to further secure the wheel balancer shaft mounting adaptor 16 onto the wheel balancer shaft 52. For example, the wheel balancer shaft mounting adaptor 16 can be made of magnetic material. Magnet 24 may be an electromagnet powered, for example, by battery 36. In another exemplary embodiment, the opening 22 can include threads such that the wheel balancer shaft mounting adaptor 16 can be threaded onto the wheel balancer shaft 52. In one example, where the diameter of the opening 22 is substantially larger than the diameter of the wheel balancer shaft 52, a diameter reducing sleeve 16A can be inserted into the opening 22.

Although the figures illustrate the wheel balancer shaft mounting adaptor 16 to be cylindrical in shape having the opening 22, one skilled in the art would recognize that any type of securing device can be used to removably secure the self-aligning laser guide 10 to the wheel balancer shaft 52. For example, the wheel balancer shaft mounting adaptor 16 can be in a form of a clamp, a sleeve with one or more locking setscrews, and/or a magnet or any other suitable device.

As stated above, the self-aligning laser guide 10 includes a body 12 that is capable of housing at least a portion of the laser beam generating device 14. In one exemplary embodiment, the laser beam generating device 14 may be mounted on a pivot 28 located in the body 12 so that an operator can easily adjust the position of the laser beam generating device 14 and reflect a generated laser beam 14A at a desired location on the top dead-center of the wheel (e.g., the rim flange of the wheel where balancing weights are generally placed and secured). Accordingly, referring to FIGS. 2 and 3, if the wheel 54 is on the x-axis and z-axis, the pivot 28 can allow the operator to rotate the laser beam generating device 14 around the x-axis to reflect the generated laser beam 14A from location 14B to location 14C (FIG. 2). Alternatively, the laser beam generating device 14 can generate a line laser that can illuminate a line extending across a portion of the wheel 54 (e.g., extend a line laser beam from approximately the top dead-center edge of the wheel 54 to approximately the wheel balancer shaft 52). In this alternative embodiment, the need for mounting the laser beam generating device 14 on the pivot 28 can be eliminated.

The body 12 may also include a locking setscrew 26 that is in communication with the laser beam generating device 14. The locking setscrew 26 can allow the operator to secure the laser beam generating device 14 in a position such that a generated laser beam/line is perpendicular to the top of the wheel balancer mounting adaptor 16; therefore, reflecting a laser beam/line at the top dead-center of the wheel 54. Accordingly, referring to FIGS. 2 and 3, if the wheel 54 is on the x-axis and the z-axis, an operator can move the laser beam generating device 14 around the y-axis to reflect the laser beam/line at the top dead-center of the wheel 54 and then secure laser beam/line in that position by the locking setscrew 26.

Again referring to FIGS. 1 and 3, the body 12 can also include a power source 36 that is in communication with a power switch 38 and the laser beam generating device 14. In one exemplary embodiment, the power source 36 may be positioned below the laser beam generating device 14 so that it can act as a counterbalance to the laser beam generating device 14. Accordingly, when the self-aligning laser guide 10 is removably connected to the wheel balancer shaft 52 via the wheel balancer shaft mounting adaptor 16, the weight of the battery 36 can cause the body 12 to freely rotate around the axle 18, due to gravity, thereby self-aligning the laser guide 10.

Figure 4:
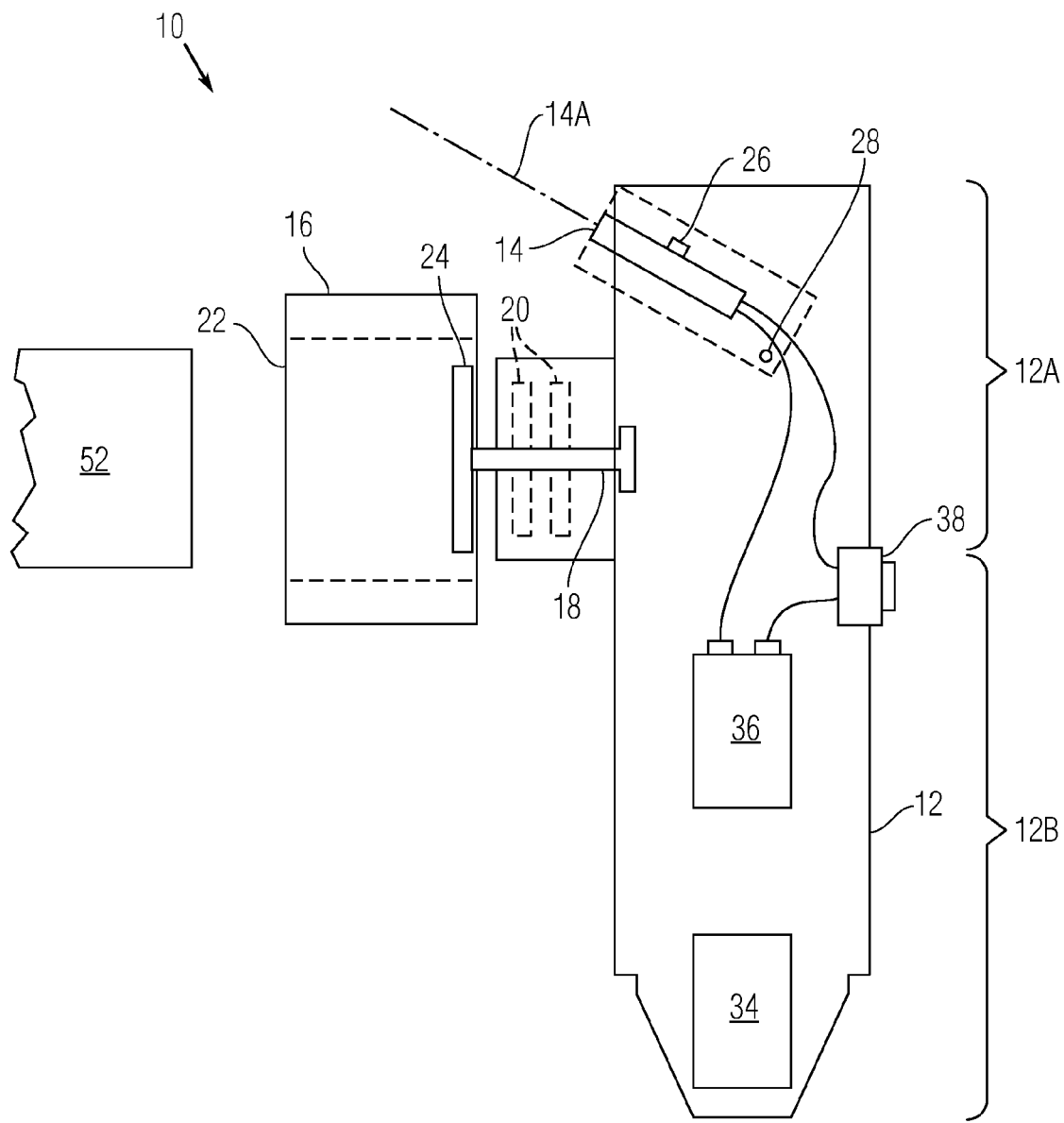
FIG. 4 is a cross-sectional view of an alternative embodiment of the self-aligning laser guide according to various embodiments.

FIG. 4 illustrates another exemplary embodiment of the self-aligning laser guide 10 of the present teachings. In this exemplary embodiment, the body 12 can include a top portion or half 12A and a bottom portion or half 12B. For example, the laser beam generating device 14 may be positioned on the top half 12A and the power source 36 may be positioned on the bottom half 12B. Furthermore, as shown in FIGS. 1 and 4, the body 12 can include a counterweight 34. For example, the counterweight 34 may be positioned on the bottom half 12B, so that when the self-aligning laser guide 10 is removably connected to the wheel balancer shaft 52 via the wheel balancer shaft mounting adaptor 16, the weight of the counter- weight 34 can cause the body 12 to freely rotate around the axle 18, due to gravity, thereby self-aligning the laser guide.

Figure 5:
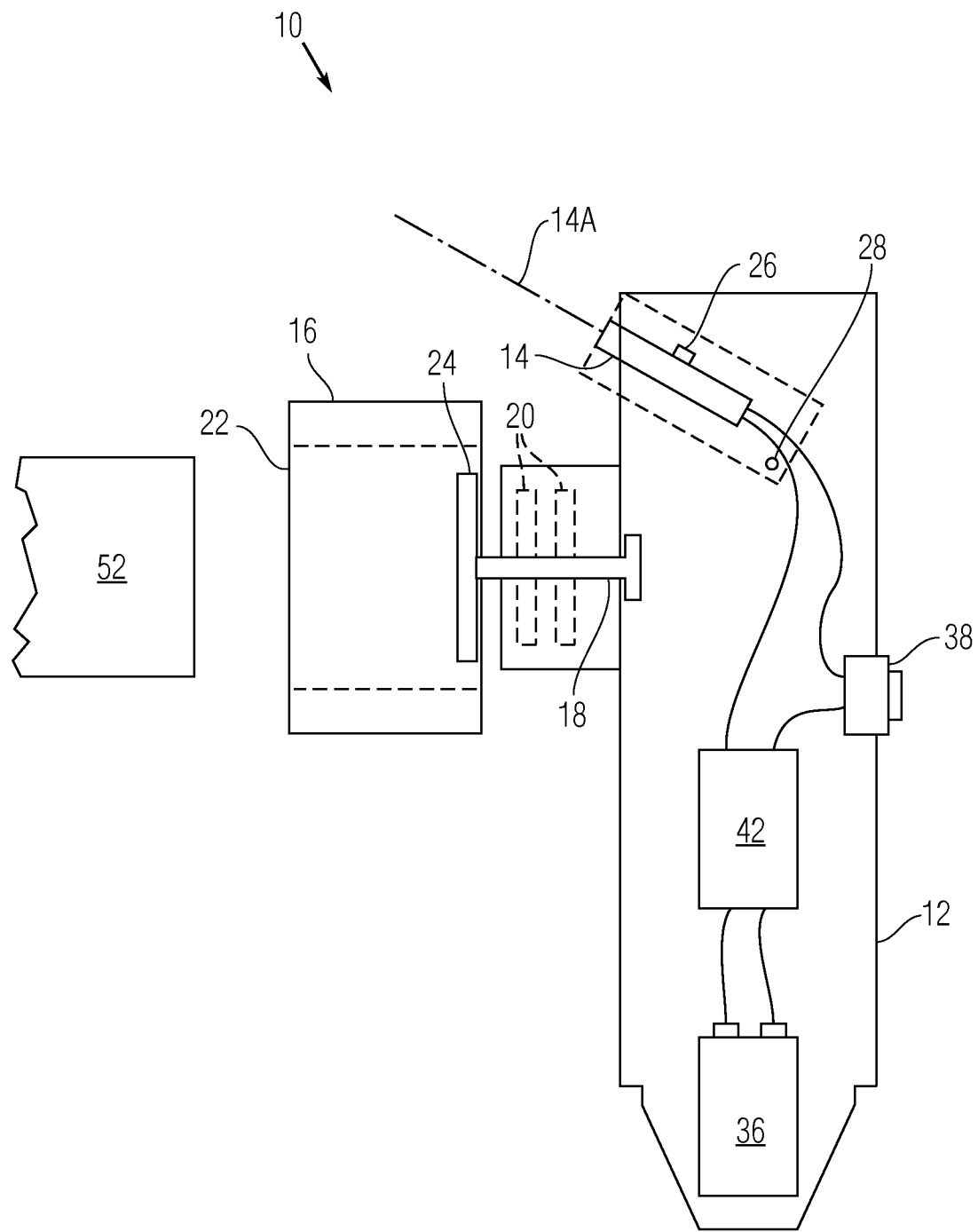
FIG. 5 is a cross-sectional view of another alternative embodiment of the self-aligning laser guide according to various embodiments.

FIG. 5 illustrates another exemplary embodiment of the self-aligning laser guide 10 of the present teachings. In this exemplary embodiment, the body 12 includes a timer 42 that connects the power source 36 to the laser beam generating device 14. Once the self-aligning laser guide 10 has been removably connected to the wheel balancer shaft 52 and has been turned on by the power switch 38, the timer 42 can disconnect the power, thereby cutting power to the laser beam generating device 14, after a predetermined time.

In another exemplary embodiment, the self-aligning laser guide 10 can include a sensor (not shown in the Figs.) that is capable of communicating with the wheel balancer 50. Generally, once the wheel balancer 50 or the operator has rotated the wheel to the position where the balancing weights need to be placed and secured at its top dead-center, the wheel balancer 50 provides the operator with a visual or audio signal. The sensor in the self-aligning laser guide 10 can then detect this signal (e.g., the audio or visual signal) and, in response, power the self-aligning laser guide 10 to indicate the exact location of the top dead-center of the wheel.

Figure 6:
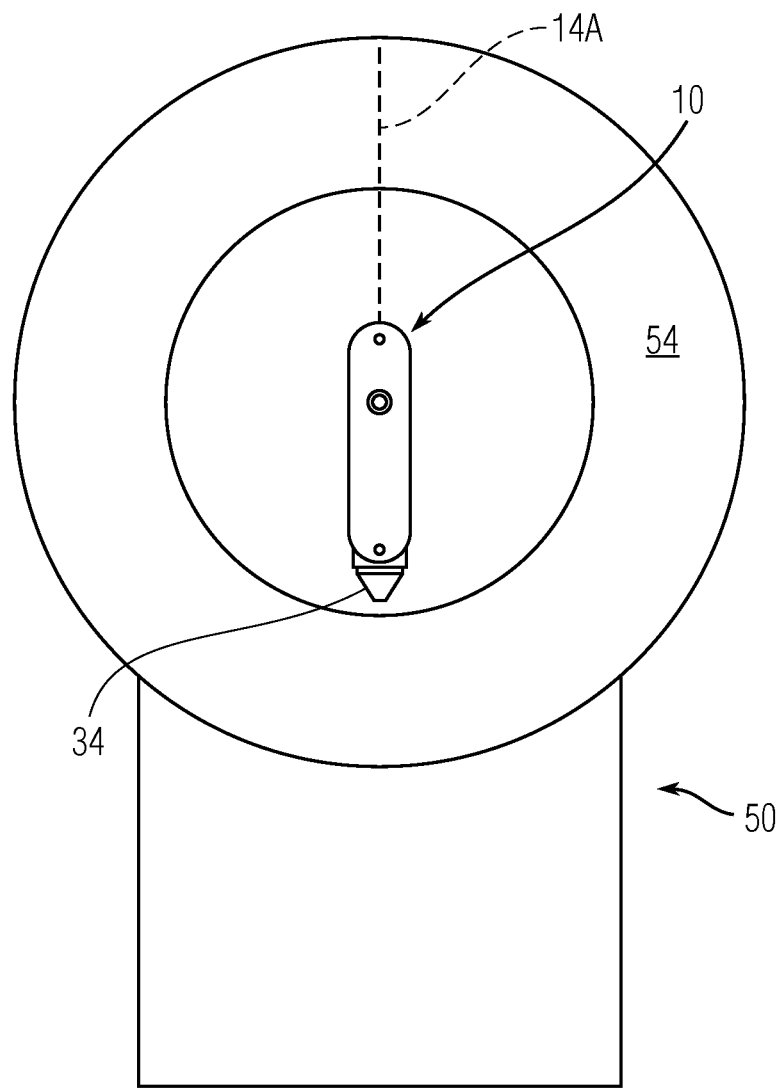
FIG. 6 is a front view of a wheel balancer with a self-aligning laser guide attached therein according to various embodiments.

Referring to FIGS. 2, 4, and 6, the use of the self-aligning laser guide 10 of the present teachings on an existing wheel balancer is described. As shown in FIG. 2, first, the wheel 54 can be mounted to the wheel balancer shaft 52 of the wheel balancer 50. The wheel balancer 50 is then turned on to rotate (i.e., spin) the wheel and calculate an effective amount of corrective weight based on the available locations and the wheel's imbalance characteristics or spin profile. Next, the operator may place the calculated effective amount of corrective weight at top dead-center on the flange of the wheel 54. To determine the top dead-center of the wheel 54, the operator can removably connect the self-aligning laser guide 10 to the wheel balancer shaft 52 by any method, such as sliding the wheel balancer shaft mounting adaptor 16 over the end of the wheel balancer shaft 52. Given that the body 12, which may include the counterweight 34, is rotatably connected to the wheel balancer shaft mounting adaptor 16, the gravity will rotate the self-aligning laser guide 10 to self-align itself in a vertical position such that the laser beam generating device 14 can reflect the generated laser beam 14A at the top dead-center of the wheel 54. The self-aligning laser guide 10 can then be turned on. In one exemplary embodiment, if the self-aligning laser guide 10 is being used for the first time, the self-aligning laser guide 10 may need to be calibrated to ensure that the laser beam generating device 14 of the self-aligning laser guide 10 is positioned such that it can reflect the generated laser beam 14A at the top dead-center of the wheel 54. To calibrate the self-aligning laser guide 10, the operator can adjust the laser beam generating device 14 to the correct position and then secure it in that position by the setscrew 26.

Generally, the balancing weights can be secured to a location of the wheel indicated by the wheel balancer 50, for example, the flange of the wheel rim. Therefore, the laser beam generating device 14 can be pivoted to reflect the generated laser beam 14A to a proper location (e.g., from location 14B to location 14C, as shown in FIG. 2) where the balancing weight can be placed and secured. The operator can then place and secure the proper amount of weight at the location indicated/illuminated by the generated laser beam 14A. Alternatively, the laser beam generating device 14 can generate a line laser that can illuminate a line extending across a portion of the wheel 54 (e.g., extending from location 14B to location 14C or below location 14C). This alternative embodiment, eliminates the need for the operator to pivot the laser beam generating device 14.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A self-aligning laser guide for a wheel balancer, comprising:
    a body including a laser beam generating device; and
    a wheel balancer shaft mounting adaptor configured to be rotatably connected to said body at one end and configured to be removably connected at another end to a wheel balancer shaft of said wheel balancer.

2. The self-aligning laser guide of claim 1, wherein said wheel balancer shaft mounting adaptor is configured to be rotatably connected to said body via an axle and at least one bearing disposed around said axle.

3. The self-aligning laser guide of claim 1, wherein said wheel balancer shaft mounting adaptor includes a threaded opening such that the wheel balancer shaft mounting adaptor screws onto said wheel balancer shaft.

4. The self-aligning laser guide of claim 1, wherein said wheel balancer shaft mounting adaptor includes an opening sized to receive said wheel balancer shaft.

5. The self-aligning laser guide of claim 4, wherein said wheel balancer shaft mounting adaptor is configured to be friction fitted onto said wheel balancer shaft.

6. The self-aligning laser guide of claim 4, wherein said wheel balancer shaft mounting adaptor includes a magnet disposed in said opening such that when said wheel balancer shaft is received in said opening, said magnet magnetically connects to said wheel balancer shaft.

7. The self-aligning laser guide of claim 1, wherein said wheel balancer shaft mounting adaptor includes an electromagnet to removably connect said wheel balancer shaft mounting adaptor to said wheel balancer shaft.

8. The self-aligning laser guide of claim 1, further comprising a securing device in communication with said laser beam generating device for calibrating and fastening said laser beam generating device at a predetermined location.

9. The self-aligning laser guide of claim 1, wherein said laser beam generating device is mounted on a pivot.

10. The self-aligning laser guide of claim 1, further comprising a timer connected to a power source and configured to disconnect power provided from said power source to said laser beam generating device after a predetermined time.

11. The self-aligning laser guide of claim 1, wherein said body includes a top half and a bottom half and wherein said laser beam generating device is positioned on said top half of said body.

12. The self-aligning laser guide of claim 11, further comprising a counterweight disposed on said bottom half of said body.

13. The self-aligning laser guide of claim 12, wherein said counterweight includes a selected weight, wherein when said self-aligning laser guide is connected to said wheel balancer shaft, said self-aligning laser guide longitudinal axis is substantially perpendicular to a floor surface.

14. The self-aligning laser guide of claim 12, wherein said counterweight comprises a power source.

15. The self-aligning laser guide of claim 1, further comprising a sensor configured to detect a signal generated by said wheel balancer that indicates to an operator to place and secure a balancing weight at a top dead-center of a wheel.

16. The self-aligning laser guide of claim 15, wherein said sensor is configured to turn on said self-aligning laser guide after receiving said signal generated from said wheel balancer.

17. A method for placing balancing weight on a wheel using the self-aligning laser guide of claim 1 comprising:
    mounting a wheel on said wheel balancer shaft of a wheel balancer;
    starting said wheel balancer;
    removably connecting said self-aligning laser guide to said wheel balancer shaft;
    powering said self-aligning laser guide to indicate a top dead-center of said wheel;
    positioning a desired balancing weight on said indicated top dead-center of said wheel; and
    securing said balancing weight on said wheel.

18. The method for placing balancing weight on a wheel using the self-aligning laser guide of claim 17, further comprising calibrating said self-aligning laser guide.

19. A self-aligning laser guide comprising:
    a body including a laser beam generating device; and
    a mounting adaptor configured to be rotatably connected to said body at one end and configured to be removably connected at another end to a device, such that when said self-aligning laser guide is removably connected to said device, said self-aligning laser guide longitudinal axis is substantially perpendicular to a floor surface.

* * * * *